(12) United States Patent
Ma et al.

(10) Patent No.: US 8,303,880 B2
(45) Date of Patent: Nov. 6, 2012

(54) PROCESS OF MANUFACTURING A PLASTIC PRODUCT WITH DECORATED SURFACES

(76) Inventors: Shui Yuan Ma, Taipei (TW); Ling-Ling Cheng, Taipei (TW)

( * ) Notice: Subject to any disclaimer, the term of this patent is extended or adjusted under 35 U.S.C. 154(b) by 664 days.

(21) Appl. No.: 12/554,991

(22) Filed: Sep. 8, 2009

(65) Prior Publication Data

US 2011/0057347 A1    Mar. 10, 2011

(51) Int. Cl.
*B29C 45/14*    (2006.01)
(52) U.S. Cl. .................................... 264/279; 264/279.1
(58) Field of Classification Search .................. 264/279, 264/279.1
See application file for complete search history.

(56) References Cited

U.S. PATENT DOCUMENTS 7,482,063 B2 *    1/2009    Minoda et al. ................ 428/520

* cited by examiner

*Primary Examiner* — Edward Johnson

(57) ABSTRACT

A process of manufacturing a plastic product includes selecting natural or synthetic fiber as a material; adhering a thermoplastic resin onto surfaces of the material to form a thin film thereon by soaking or heating; heating the thin film; forming two releasable films on upper and lower surfaces of the thin film respectively; cutting the thin film into thin film units; heating and pressing the thin film units to form cured thin film units; applying one of the cured thin film units onto an inner surface of a first mold; further heating and pressing the cured thin film unit to form a thin film structure; placing the thin film structure inside a second mold; and injecting a thermoplastic material into the second mold to adhere onto an outer surface of the thin film structure to produce the finished plastic product.

9 Claims, 2 Drawing Sheets

PROCESS OF MANUFACTURING A PLASTIC PRODUCT WITH DECORATED SURFACES

BACKGROUND OF THE INVENTION

1. Field of Invention

The invention relates to plastic product manufacturing processes and more particularly to a process of manufacturing a plastic product with decorated surfaces (e.g., an inner surface of the plastic product) by forming a thin film structure made of natural or synthetic fiber, placing the thin film structure in a mold, and injecting a thermoplastic material into a space between the thin film structure and the mold.

2. Description of Related Art

Plastic products are widely used in our daily life. Further, an aesthetic surface of a plastic product is desired. Therefore, techniques for decorating plastic surfaces are available. For example, IMD (In-mold decoration) is a type of plastic molding for decorating plastic surfaces with color and/or with an abrasion resistant coat. Thus, continuing improvements in the exploitation of processes of decorating plastic surfaces are constantly being sought.

SUMMARY OF THE INVENTION

It is therefore one object of the invention to provide a process of manufacturing a plastic product with decorated surfaces.

The above and other objects, features and advantages of the invention will become apparent from the following detailed description taken with the accompanying drawings.

DETAILED DESCRIPTION OF THE INVENTION

Figure 1:
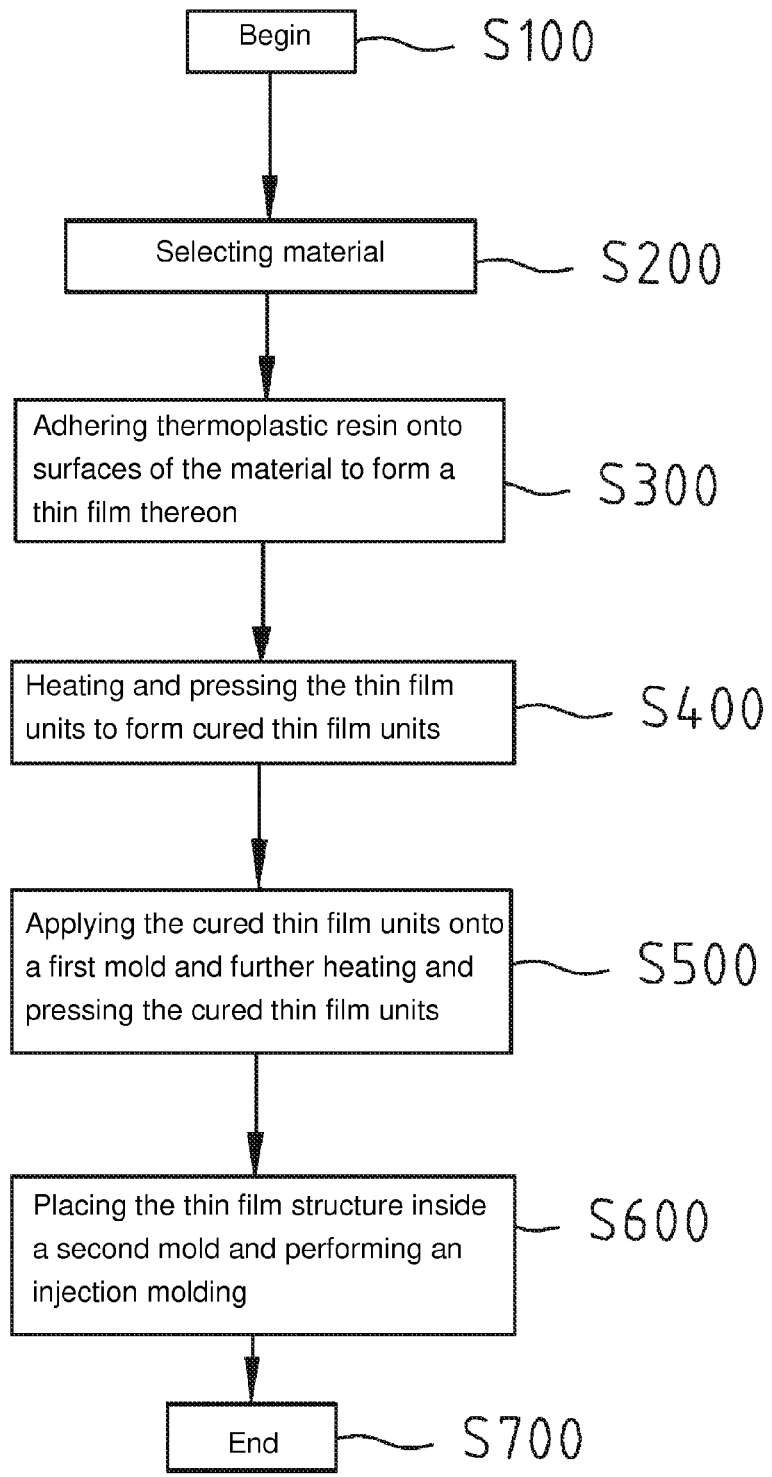
FIG. 1 illustrates a process of manufacturing a plastic product with decorated surfaces according to the invention.
Figure 2:
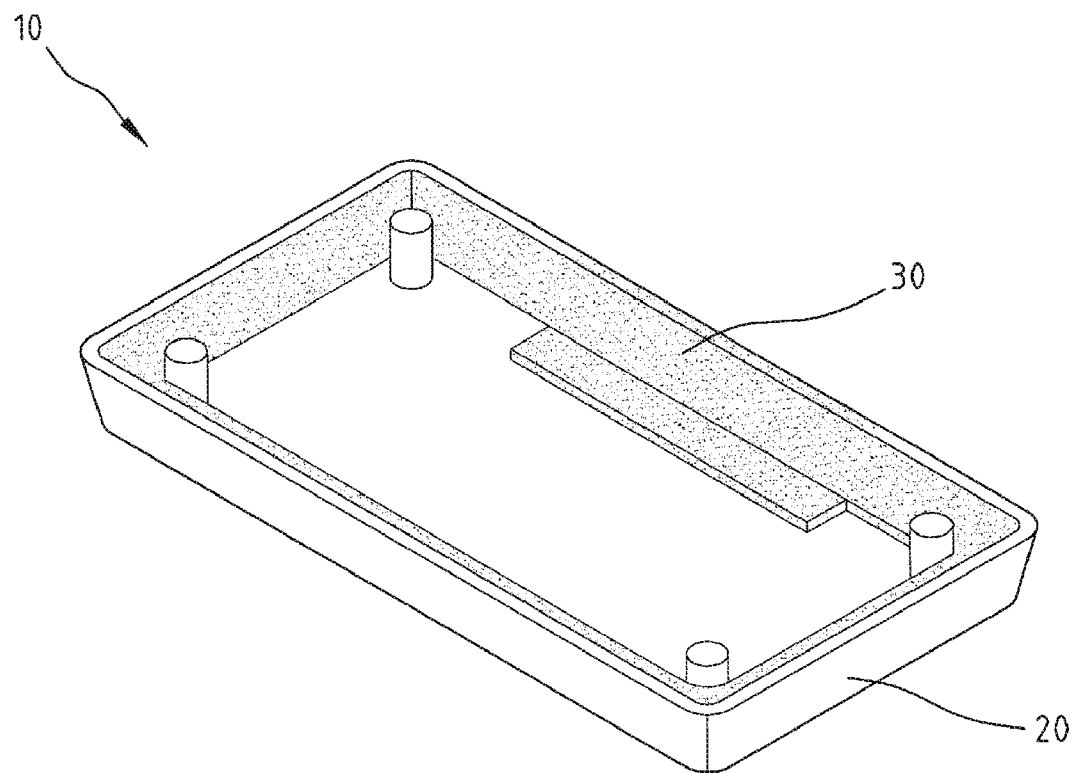
FIG. 2 is a perspective view of a concave plastic product with a thin film structure being formed on its inner surface according to the process of the invention.

Referring to FIGS. 1 and 2, a process of manufacturing a plastic product with decorated surfaces in accordance with the invention is illustrated. The process comprises the following steps as discussed in detail below.

In step S100, the process begins.

In step S200, a material is selected. The material can be natural or synthetic fiber such as inked cloth, fabric, paper, bark, the outside covering of the stem of bamboo, or leather.

In step S300, a thermoplastic resin is adhered onto surfaces of the selected material to form a thin film thereon by soaking or heating. Next, the thin film is heated. Next, two releasable films are formed on upper and lower surfaces of the thin film respectively. Next, the thin film is cut into a plurality of thin film units of predetermined size.

Preferably, the thermoplastic resin is selected from the group consisting of PMMA (polymethyl methacrylate), PEI (polyethyleneimine), PU (polyurethane), TPU (thermoplastic polyurethane), PES (polyether sulfone), PPE (polyphenyl ether), PS (polystyrene), and PEEK (polyarylether etherketone).

In step S400, the thin film units are subject to heating and pressing to form cured thin film units which have a uniform resin distribution, even surfaces, bright, transparent, and an improved texture. The heating and pressing is performed at a temperature of between about 50° C. and 180° C. with a pressure of between about 2 to 20 kg per square centimeter for about 10 to 40 minutes.

In step S500, the cured thin film units are applied onto surface(s) of a first mold with further heating and pressing being performed subsequently. The heating and pressing is performed at a temperature of between about 120° C. and 200° C. with a pressure of between about 2 to 20 kg per square centimeter and a vacuum degree of between about 50% to 85%. As a result, a thin film structure 30 is formed.

In step S600, the thin film structure 30 is placed inside an opened second mold. Next, an injection molding is performed on the second mold by injecting a thermoplastic material into the second mold to adhere onto an outer surface of the thin film structure 30. As a result, a molded structure 20 is formed in the second mold and the molded structure 20 has a desired shape. Moreover, the molded structure 20 is formed with the thin film structure 30. As an end, a finished plastic product 10 is produced.

In step S700, the process ends.

Preferably, the thermoplastic material is selected from the group consisting of ABS (acrylonitrile butadiene styrene), PC/ABS (polycarbonate/acrylonitrile butadiene styrene), PC (polycarbonate), PMMA (polymethyl methacrylate), PS (polystyrene), PP (polypropylene), PET (polyethylene terephthalate), POM (polyoxymethylene), and PA (polyamide).

In step S200, a sub-step of shaping the selected material may be performed. The shaping may be implemented as a sub-step of pressing the selected material by rotating rollers thereon. This sub-step has the benefits of facilitating the subsequent step S300 and increasing yield.

Moreover, a first sub-step of further cutting the cured thin film units may be performed before the step S500 so that each cured thin film unit may have a size slightly larger than the mold. In addition, a second sub-step of preheating the further cut cured thin film units at a temperature of about 10° C. to 30° C. lower than the temperature of the first mold can be performed.

Moreover, a sub-step of trimming or punching the thin film structure 30 may be performed by means of CNC (computer numerical control) or lathe before the step S600. This sub-step aims to remove remnants (i.e., flakes) from the thin film structure 30 so that an aesthetic finished product can be obtained.

Referring to FIG. 2, a concave plastic product 10 comprising a thin film structure 30 being formed on an inner surface of a molded structure 20 is shown.

While the invention herein disclosed has been described by means of specific embodiments, numerous modifications and variations could be made thereto by those skilled in the art without departing from the scope and spirit of the invention set forth in the claims.

What is claimed is:

1. A process of manufacturing a plastic product comprising the steps of:
   (a) selecting natural or synthetic fiber as a material;
   (b) adhering a thermoplastic resin onto surfaces of the material to form a thin film thereon by soaking or heating;
   (c) heating the thin film;
   (d) forming two releasable films on upper and lower surfaces of the thin film respectively;
   (e) cutting the thin film into a plurality of thin film units of predetermined size;
   (f) heating and pressing the thin film units to form cured thin film units;

(g) applying one of the cured thin film units onto an inner surface of a first mold;

(h) further heating and pressing the cured thin film unit to form a thin film structure;

(i) placing the thin film structure inside a second mold; and (j) injecting a thermoplastic material into the second mold to adhere onto an outer surface of the thin film structure to produce the finished plastic product.

2. The process of claim 1, further comprising the sub-step of shaping the material after step (a).

3. The process of claim 2, wherein the sub-step of shaping the material comprises pressing the material by rotating rollers thereon.

4. The process of claim 1, wherein the thermoplastic resin is selected from the group consisting of PMMA (polymethyl methacrylate), PEI (polyethyleneimine), PU (polyurethane), TPU (thermoplastic polyurethane), PES (polyether sulfone), PPE (polyphenyl ether), PS (polystyrene), and PEEK (polyarylether etherketone).

5. The process of claim 1, wherein step (f) is performed at a temperature of between about 50° C. and 180° C. with a pressure of between about 2 to 20 kg/cm$^2$ for about 10 to 40 minutes.

6. The process of claim 1, wherein step (h) is performed at a temperature of between about 120° C. and 200° C. with a pressure of between about 2 to 20 kg/cm$^2$ and a vacuum degree of between about 50% to 85%.

7. The process of claim 1, further comprising the sub-steps of further cutting the cured thin film units to have a size larger than the mold, and preheating the further cut cured thin film units at a temperature of about 10° C. to 30° C. lower than the temperature of the first mold before step (h).

8. The process of claim 1, wherein the thermoplastic material is selected from the group consisting of ABS (acrylonitrile butadiene styrene), PC/ABS (polycarbonate/acrylonitrile butadiene styrene), PC (polycarbonate), PMMA (polymethyl methacrylate), PS (polystyrene), PP (polypropylene), PET (polyethylene terephthalate), POM (polyoxymethylene), and PA (polyamide).

9. The process of claim 1, further comprising the sub-step of removing remnants from the thin film structure before step (j).

\* \* \* \* \*